United States Patent [19]
Williston

[11] Patent Number: 4,573,098
[45] Date of Patent: Feb. 25, 1986

[54] GROUND VOLTAGE SUPPRESSION

[76] Inventor: Dale B. Williston, 55 Shier Dr., Scarborough, Ontario, Canada, M1J 2G1

[21] Appl. No.: 545,252

[22] Filed: Oct. 25, 1983

[30] Foreign Application Priority Data

Jul. 6, 1983 [CA] Canada ................................. 431908

[51] Int. Cl.[4] .............................................. H02H 9/04
[52] U.S. Cl. ..................................... 361/42; 307/327; 361/43; 361/58
[58] Field of Search .................. 361/1, 10, 11, 62, 42, 361/43, 58; 307/90, 148, 326–328

[56] References Cited

U.S. PATENT DOCUMENTS 2,087,340  7/1937  Davis .............................. 307/328 X
3,855,501 12/1974  Agnew ................................. 361/58

OTHER PUBLICATIONS

"Milking Parlor Metal Structure-to-Earth Voltages", 1978–Fairbank et al., Western Regional Agricultural Engineering Service.

"Stray Voltages in Agriculture"–Summary Proceedings of Stray Voltage Workshop, 8/83, Minneapolis, MN.

Primary Examiner—Harry E. Moose, Jr.
Attorney, Agent, or Firm—Ridout & Maybee

[57] ABSTRACT

In a power supply system having a grounded neutral and supplying service equipment through a distribution transformer, a ground voltage suppression device comprises a saturating inductor or like non-linear impedance device connected between the secondary neutral conductor and a normal ground conductor so as to define therewith a neutral-to-ground current path which presents a high impedance to current flow for applied voltages up to a predetermined level.

9 Claims, 6 Drawing Figures

GROUND VOLTAGE SUPPRESSION

This invention relates generally to devices for alleviating the problem of voltage on the ground systems of electrical equipment, supplied from a distribution transformer, due to primary circuit neutral potential rise. The problem is widespread and can occur wherever the power supply system has a grounded neutral to which the ground system of the equipment is tied directly.

The problem has arisen particularly with electrical equipment on farms, where electrical casing structures or the like tied to a service ground are accessible to livestock, and has become particularly serious on dairy farms, since dairy cows are especially sensitive to a.c. voltages. With a cow standing on "true ground", such as wet concrete, exposure to voltages of little more than one volt above "true ground" may result in a serious loss of milk production.

The present invention arises out of an investigation of the problem where the power supply system has a grounded neutral. Typically the system includes a distribution transformer having primary and secondary windings providing respective input and output terminals, one input terminal being connected to true ground via a first ground connection and the output terminals being connected via line and neutral conductors to respective terminals of a service panel.

The service panel is usually housed in a metal enclosure which is connected to true ground via a second ground connection. The service panel housing may not be of metal, but there will in any event be a terminal which is connected to true ground and defines a service ground. The neutral conductors of the primary and secondary circuits are normally at a slightly different potential from true ground since the ground connections which carry ground current have a finite impedance. The basic problem is to keep the potential at the service ground of the user's equipment small, typically less than 1 volt, despite substantial voltage rise (up to 14 volts) on the neutral of the primary circuit. One cannot simply isolate the neutral of the secondary circuit since it is necessary to provide a fuse path for overload current in the event of a line fault.

The present invention solves the problem by providing a non-linear impedance device, specifically a saturating inductor, connected between the secondary neutral conductor and one or other of the ground connections so as to define with it a neutral-to-ground current path; the saturating inductor presents a high impedance to current flow at applied voltages below a selected predetermined level, e.g. 14 volts, and a low impedance to current flow at applied voltages above that level.

In a preferred embodiment of the invention, in which the service panel is housed in a metal enclosure, the service panel is insulated from the metal housing, the saturating inductor being connected between the neutral terminal of the service panel and the second ground connection in series with the latter. Thus, in this case, the saturating inductor is connected simply between the neutral terminal and the service ground.

In an alternative embodiment the neutral terminal of the service panel is grounded via the second ground connection and the saturating inductor is mounted at the distribution transformer and connected between the neutral conductor and the first ground connection in series with the latter.

In order that the invention may be readily understood two embodiments thereof, as applied to the ground systems of electrical equipment on dairy farms, will now be described by way of example with reference to the accompanying drawings, in which.

Figure 1:
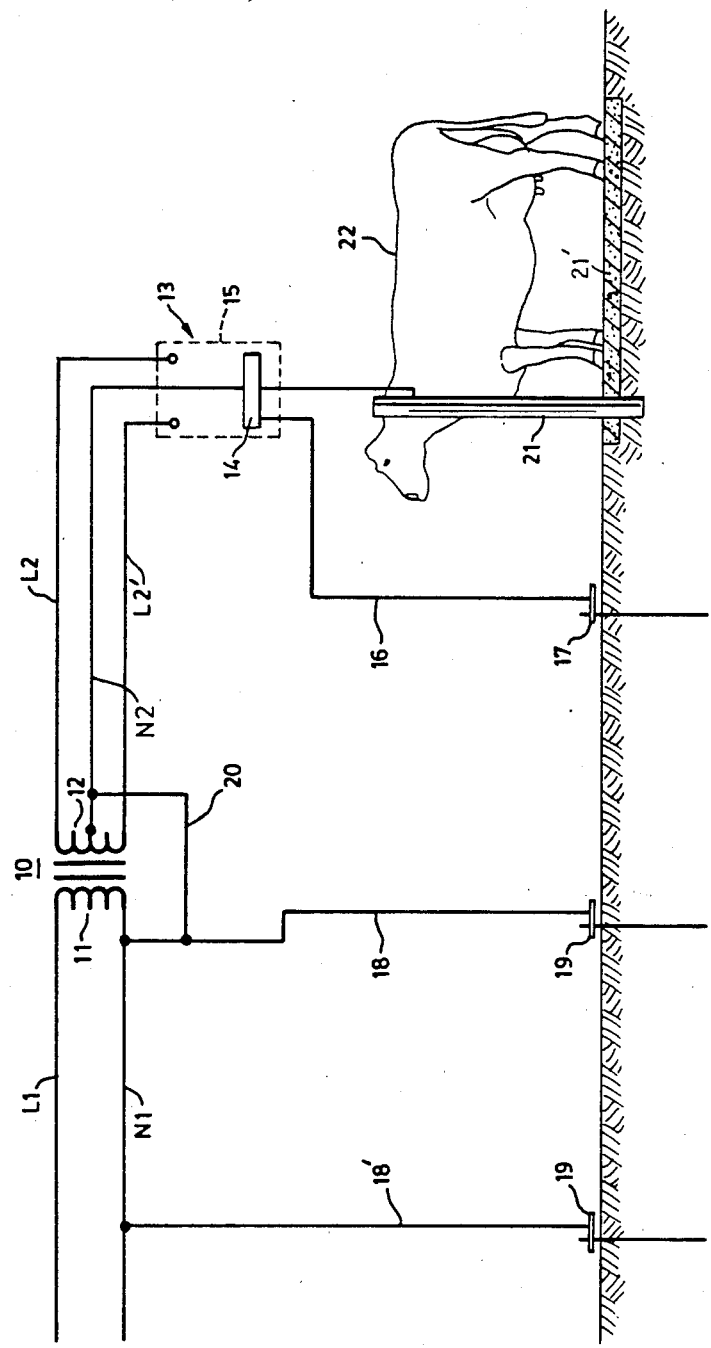
FIG. 1 is a diagrammatic illustration of a power supply system servicing a farm in the conventional manner wherein dairy cows may come into contact with the local ground system.

Referring to FIG. 1, a typical power supply system servicing a farm comprises a distribution transformer 10 having a primary winding 11 connected to line and neutral conductors L1, N1 respectively and a secondary winding 12 whose output terminals are connected to the line conductors L2, L2' and neutral conductor N2 of the secondary circuit which are taken to a conventional service panel 13, the neutral conductor N2 being connected to a neutral block 14 which is grounded via the metal enclosure 15 of the service panel, the latter being connected to true ground by a ground conductor 16 and ground rod 17. The primary neutral conductor N1 is also grounded by ground conductors 18, 18'—distributed along the line and connected to true ground by ground rods 19, 19'—. The primary and secondary neutral terminals of the transformer 10 are interconnected in accordance with conventional practice by an electrical bond 20.

Since the metal casing 15 is grounded by the conductor 16 it is treated as being at ground potential, as also are metal structures such as a stanchion pipe 21 which are connected electrically to it. The neutral block 14 and casing 15 define a casing ground, or service ground. However, since the ground conductor 16 has a finite impedance, a potential difference between the service ground and true ground can occur, and will generally result from any rise in the primary neutral voltage. Although the potential difference will usually be quite small, even a small potential difference of little more than one volt can adversely affect the milk yield of a cow exposed to it. For example, in FIG. 1, a cow 22 is shown standing on wet concrete paving 21 which is at true ground potential but has placed its neck against the stanchion pipe 21 which is at service ground potential.

The present invention relates to a modified system in which the service ground potential remains close to true ground notwithstanding normal fluctuations in primary neutral voltage.

Figure 2:
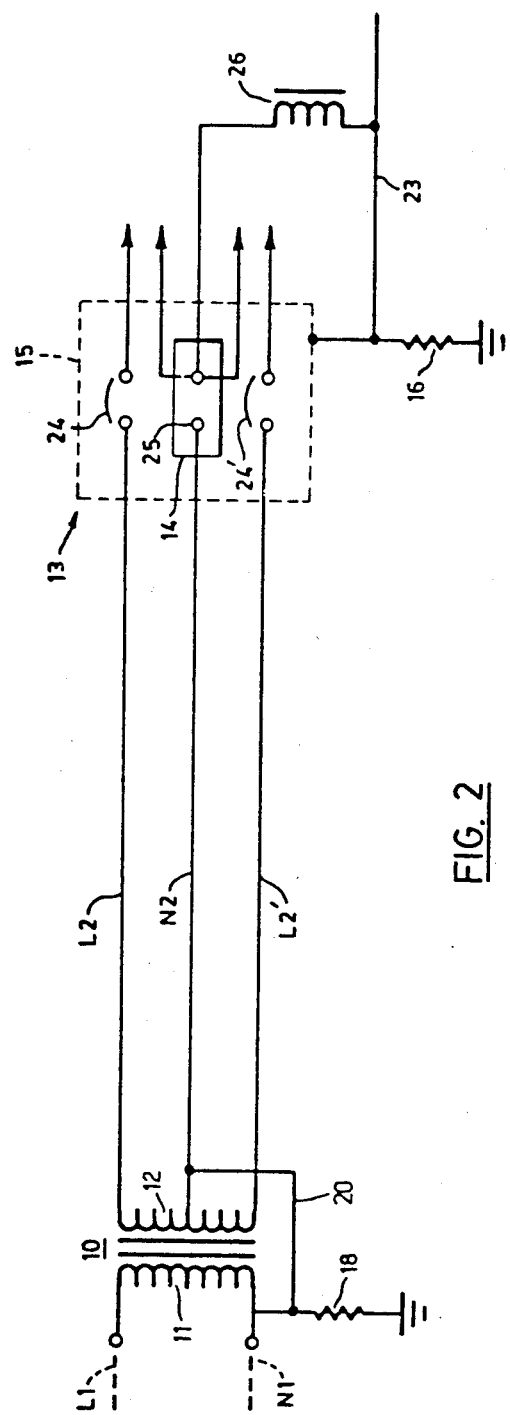
FIG. 2 is a wiring diagram of a supply system having ground voltage suppression means in accordance with a first embodiment of the invention.

Referring to FIG. 2, the distribution transformer 10 has primary and secondary windings 11, 12 providing respective input and output terminals, the input terminals being connected to the line conductor L1 and neutral conductor N1 of the primary circuit, and the output terminals being connected to the line conductors L2, L2' and neutral conductor N2 of the secondary circuit, which are connected to respective terminals of the service panel 13. The primary neutral conductor N1 is connected to true ground via a ground conductor 18 having a finite impedance. The metal enclosure 15 of the service panel is also connected to true ground via a ground conductor 16 having a finite impedance. The casing 15 defines a service ground represented in FIG. 2 by a line 23. The service panel enclosure 15 also houses isolating switches 24, 24' in circuit with the line conductors.

The secondary neutral conductor N2 is connected to a corresponding terminal 25 on the neutral block 14, as in the conventional system shown in FIG. 1, but in the present example the neutral block 14 is insulated from the casing 15 and so is not tied to the potential of the latter. However, it is necessary to provide a fuse path for overload currents, and for this purpose a non-linear impedance device, represented by a saturating inductor 26, is connected directly between the neutral block 14 and the service ground 23. The saturating inductor 26 is essentially a component which presents a high impedance to current flow at applied voltages below a predetermined level, typically 14 volts in the present example, and a low impedance to current flow at applied voltages above that level so as to present a fuse path for overload current in the event of a line fault. Preferably, to provide protection from lightning surges a lightning arrester (not shown) may be connected in parallel with the saturating inductor 26.

Figure 6:
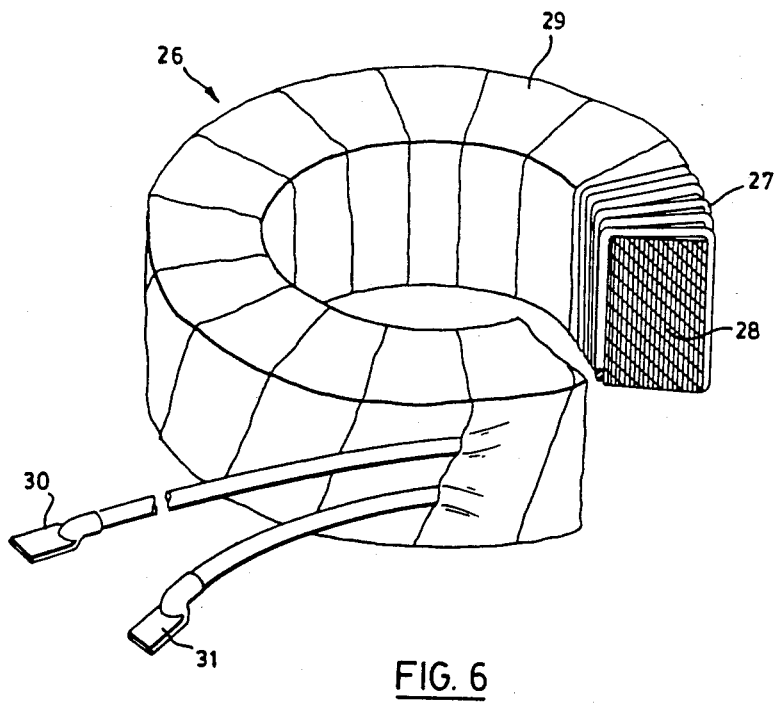
FIG. 6 is a partly sectioned view of a saturating inductor used in carrying out the invention.

One saturating inductor 26 is illustrated in FIG. 6. For the present application, the inductor 26 comprises turns of heavy gauge copper magnet wire 27 uniformly distributed around a toroidal core 28. The core 28 consists of a tape wound, spot welded strip of grain oriented silicon steel, Grade M4, wrapped in insulating tape 29. The torodially wound coil 27 provides end terminals 30, 31. However, it is to be understood that the specific design of the inductor 26 will be chosen according to the specific operating conditions in any specific case, having regard to current and voltage ratings, thermal requirements, and permissible tingle voltage level.

Figure 5:
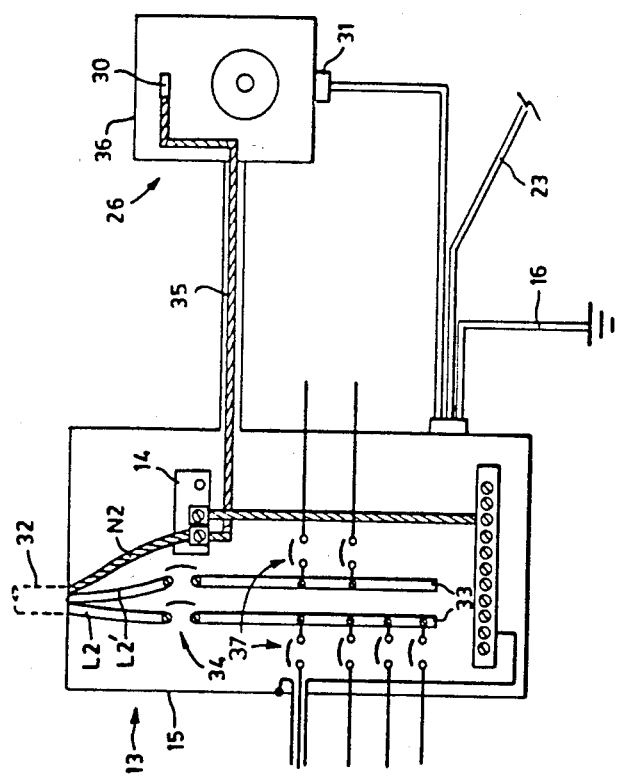
FIG. 5 shows diagrammatically the modified layout of a service panel as used in the embodiment of FIG. 2.

A typical arrangement of the service panel and associated saturating inductor is illustrated in FIG. 5. The service box 15 provides an inlet for the power cable 32, the line conductors L2, L2' being connected to terminal blocks 33 through a main entrance breaker 34, corresponding to the switches 24, 24' of FIG. 2, and the neutral conductor N2 being connected to the neutral block 14. The neutral block 14 is insulated from the box 15 in which it is housed, and a lead 35 is taken therefrom to one terminal 30 of the saturating inductor 26, which is shielded by a casing 36. The casing 36 and the service casing 15 are grounded via the ground lead 16. The line conductors of various branch circuits, with branch circuit breakers 37, are shown in the figure, these being conventional, but the essential feature of this arrangement is that the neutral block 14 is insulated from the service casing 15 and the neutral conductor 35 therefrom is connected to the service ground 23 through the saturating inductor 26, the latter defining with the ground connection 16 a neutral-to-ground current path.

Figure 3:
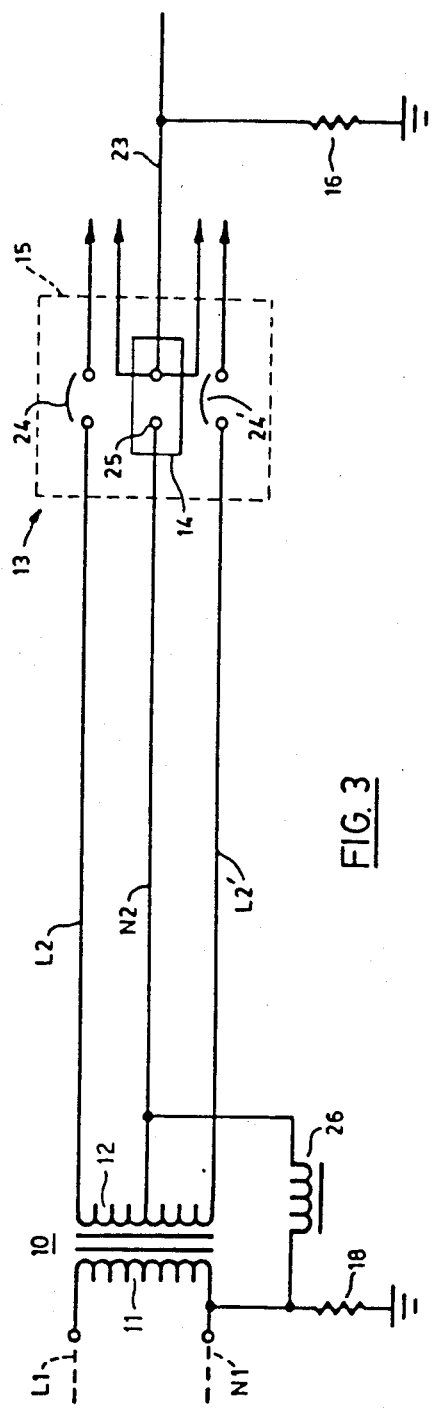
FIG. 3 is a wiring diagram of a supply system having ground voltage suppression means in accordance with a second embodiment of the invention.
Figure 4:
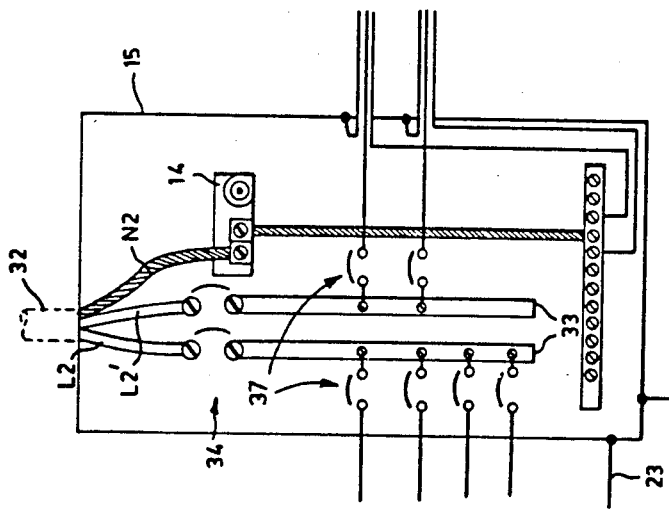
FIG. 4 shows diagrammatically the layout of a service panel as used in the embodiment of FIG. 3.

In an alternative embodiment of the invention, the arrangement of the service panel is conventional and is shown in FIG. 4. This arrangement differs essentially from the one shown in FIG. 5 in that the neutral block 14 is mounted directly on the casing 15 without being insulated from it. In this case the saturating inductor 26 is mounted at the distribution transformer 10 as shown in FIG. 3. The saturating inductor is connected directly between the primary and secondary neutral conductors N1, N2 so as to define with the ground connection 18 a series neutral-to-ground current path from the secondary neutral conductor N2. As in the first embodiment, a lightning arrester may be connected in parallel with the saturating inductor 26 to provide protection from lightning surges.

It is to be understood that variants within the scope of the invention are envisaged. For example, the first and second ground connections shown as single conductors may in fact each be represented by a plurality of conductors, those of the first ground connection being distributed along the primary neutral conductor and those of the second ground connection being distributed along the service ground. Moreover, the housing of the service panel, although most commonly of metal, need not be metallic, but in such case the service panel must provide a terminal which defines the service ground.

What I claim is:

1. In a power supply system including a distribution transformer having primary and secondary windings providing respective input and output terminals, one said input terminal being connected to true ground via a first ground connection and said output terminals being connected via line and neutral conductors to respective terminals of a service panel the neutral terminal being connected to true ground via a second ground connection, the improvement comprising non-linear impedance means formed by a saturating inductor connected between the neutral conductor and one said ground connection and defining with the latter a neutral-to-ground current path, said saturating inductor presenting a high impedance to current flow at applied voltages below a predetermined level and a low impedance to current flow at applied voltages above said predetermined level.

2. A power supply system according to claim 1, in which said neutral terminal of the service panel is grounded via said second ground connection the saturating inductor being mounted at the distribution transformer and connected between the neutral conductor and said first ground connection in series with the latter.

3. A power supply system according to claim 1, wherein the service panel is housed in a metal enclosure and wherein the neutral terminal of the service panel is insulated from the housing, the saturating inductor being connected between said neutral terminal and the second ground connection in series with the latter.

4. A power supply system according to claim 1, 2 or 3, in which the saturating inductor has a winding uniformly distributed along a toroidal core.

5. In a power supply system comprising a distribution transformer having primary and secondary windings, each providing line and neutral terminals, ground voltage suppression means comprising a saturating inductor interconnecting said neutral terminals of the primary and secondary windings, the saturating inductor presenting a high impedance to current flow at applied voltages below a predetermined level and a low impedance to current flow at applied voltages below a predetermined level.

6. In a power supply system including a service panel providing line and neutral supply terminals for connection to respective terminals of a supply transformer, the service panel being housed in a metal enclosure which is connected to true ground via a ground connection, the enclosure defining a casing ground, the improvement in which the neutral terminal is connected to the casing ground via a saturating inductor adapted to present a high impedance to current flow at applied voltages below a predetermined level and a low impedance to current flow at applied voltages above said predetermined level.

7. A power supply system according to claim 5 or 6, in which the saturating inductor has a winding uniformly distributed along a toroidal core.

8. In a power supply system comprising a distribution transformer having primary and secondary windings, each providing line and neutral terminals, said line and neutral terminals being connected to respective line and neutral terminals of a service panel providing a service ground connected to true ground via a ground connection, said service ground being accessible to farm livestock standing on true ground, the improvement comprising ground voltage suppression means comprising a saturating inductor interconnecting said neutral terminals of the primary and secondary windings, the saturating indicator presenting a high impedance to current flow at applied voltages below a predetermined level of about 14 volts and a low impedance to current flow at applied voltages above said predetermined level.

9. In a power supply system including a service panel providing line and neutral supply terminals for connection to respective terminals of a supply transformer, the service panel being housed in a metal enclosure which is connected to true ground via a ground connection, the enclosure defining a casing ground which is accessible to farm livestock standing on true ground, the improvement in which the neutral terminal is connected to the casing ground via a saturating inductor adapted to present a high impedance to current flow at applied voltages below a predetermined level of about 14 volts and a low impedance to current flow at applied voltages above said predetermined level.

* * * * *